3,410,849
PHENOTHIAZINE DERIVATIVES
Jany Renz, Basel, Jean-Pierre Bourquin, Magden, and Gustav Schwarb, Allschwil, Switzerland, assignors to Sandoz Ltd. (also known as Sandoz A.G.), Basel, Switzerland
No Drawing. Filed Nov. 21, 1966, Ser. No. 595,579
Claims priority, application Switzerland, Nov. 23, 1965, 16,100/65; Aug. 3, 1966, 11,199/66
8 Claims. (Cl. 260—243)

ABSTRACT OF THE DISCLOSURE 3-(lower)alkylmercapto - 10 - (dialkylaminopropionyl) phenothiazines and their pharmaceutically acceptable salts are anti-depressants.

---

The present invention relates to new heterocyclic compounds and a process for their production.

The present invention provides compounds of general Formula I,

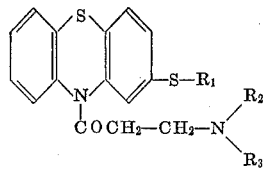

in which $R_1$ signifies an alkyl radical having from 1 to 4 carbon atoms, and each of $R_2$ and $R_3$ signifies a hydrogen atom or an alkyl radical having from 1 to 4 carbon atoms,
and their acid addition salts.

The present invention further provides a process for the production of compounds of general Formula I and their acid addition salts, characterized in that a compound of general Formula II,

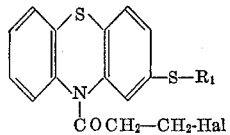

in which $R_1$ has the above significance, and Hal signifies a chlorine or bromine atom, is reacted with a compound of general Formula IV,

in which $R_2$ and $R_3$ have the above significance, in an organic solvent which is inert under the reaction conditions, and when an acid addition salt is required, the resulting compound of general Formula I is reacted with an organic or inorganic acid.

The reaction in accordance with the invention is preferably effected in the presence of an acid binding agent. Examples of acid binding agents which may be used are strong anhydrous bases which do not react with the compound of general Formula II, e.g. N-methylpiperidine and N,N'-dimethylpiperazine, or an excess of the basic reaction component of general Formula IV. In order to have a sufficient excess of basic reaction components at least two mols of compound IV for every mol of compound II are used for the reaction in accordance with the invention. A suitable organic solvent which is inert under the reaction conditions is an aromatic hydrocarbon of the benzene series, e.g. benzene and toluene. The reaction is preferably effected at a temperature between 50° C. and the boiling temperature of the solvent used; the reaction time is betwen 2 and 6 hours. When the reaction temperature is above that of the boiling temperature of the amine reactant of general Formula IV used, the reaction may be effected in a closed vessel (autoclave).

One preferred method of effecting the process of the invention consists of reacting a compound of general Formula II with a compound of general Formula IV (at least 2 mols of compound IV for every mol of compound II) in benzene at a temperature between 60° C. and the boiling temperature of benzene (70–100° C. bath temperature) for 4 to 6 hours. The resulting compound of general Formula I is then worked up in manner known per se, e.g. by extraction from the reaction mixture with an aqueous acid and liberation of the base from the resulting salt with an aqueous alkali, and is isolated and purified in manner known per se and/or optionally converted into its acid addition salts by subsequent reaction with an organic or inorganic acid.

The compounds of general Formula II used as starting materials are new and their production also forms part of the present invention. They may be obtained by reacting a compound of general Formula III,

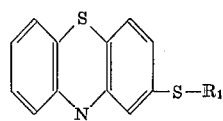

in which $R_1$ has the above significance, with a compound of general Formula V,

Hal—CO—CH$_2$—CH$_2$—Hal  (V)

in which Hal has the above significance, in an organic solvent which is inert under the reaction conditions, e.g. toluene, at the boiling temperature of the solvent; the reaction mixture is subsequently heated at the boil for about 4 hours to complete the reaction.

Compounds I are basic compounds which are oily or crystalline at room temperature; with inorganic or organic acids they form stable salts which are crystalline at room temperature. Examples of acids for acid addition salt formation are the following: hydrochloric, citric, tartaric, succinic, maleic, malic, acetic, benzoic, fumaric, gallic, hexahydrobenzoic, methanesulphonic, benzenesulphonic, napthalene-1,5-disulphonic and phosphoric acid.

Compounds I and their physiologically tolerable salts with organic or inorganic acids are characterized by the typical properties of antidepressants, which manifest themselves inter alia by an inhibition of the tetrabenazine syndrome and a central anticholinergic effect. The peripheral anticholinergic effect, however, is weak. Compounds I and their physiologically tolerable salts with organic or inorganic acids are, therefore, indicated for use in the treatment of conditions of depression or psychosomatic and neurotic illnesses in hospitalized and ambulant patients.

Of the compounds of general Formula I the compound 3 - methylmercapto - 10 - (3 - diethylamino-propionyl)-phenothiazine is especially useful.

A suitable daily dose of compounds I is 20 to 500 mg.

The compounds of the invention may be used as pharmaceuticals on their own or in the form of appropriate medicinal preparations for administration, e.g. enterally or parenterally. In order to produce suitable medicinal preparations, the compounds are worked up with inorganic or organic adjuvants which are inert and physiologically acceptable. Examples of such adjuvants are:

For tablets and dragées—lactose, starch, talc and stearic acid;

For syrups—solutions of cane sugar, invert sugar and glucose;

For injectable solutions—water, alcohols, glycerin and vegetable oils;

For suppositories—natural or hardened oils and waxes. The preparations may furthermore contain suitable preserving, stabilizing and wetting agents, solubilizers, sweetening and colouring substances and flavourings.

Each of the above mentioned pharmacologically effective compounds may be used, for example, for oral administration in the form of a tablet having the following composition:

1–3% of binding material (e.g. tragacanth), 3–10% of starch, 2–10% of talcum, 0.25–1% of magnesium stearate, the corresponding amount of active material and filling material, e.g. lactose, to make up 100%.

The salt of naphthalene-1,5-disulphonic acid is named the nadisylate in the following examples.

The term "in manner known per se" as used herein designates methods in use or described in the literature on the subject.

In the following non-limitative examples all temperatures are indicated in degrees centigrade and are corrected.

Example 1.—3-methylmercapto-10-(3-diethylamino-propionyl)-phenothiazine (a) 3 - methylmercapto - 10 - (3 - chloropropionyl) - phenothiazine.—28.5 g. of 3-chloro-propionic acid chloride are added dropwise at a bath temperature of 150° whilst stirring during the course of half an hour to a boiling solution of 50.0 g. of 3-methylmercapto-phenothiazine (melting point 138–140°) in 200 cc. of toluene and boiling is then effected for a further 4 hours. After cooling well, filtration and crystallization from benzene are effected. Pure 3-methylmercapto-10-(3-chloropropionyl)-phenothiazine has a melting point of 102°–104°.

(b) 3 - methylmercapto - 10 - (3 - diethylamino - propionyl) - phenothiazine.—A mixture of 31.2 g. of 3 - methylmercapto - 10 - (3 - chloropropionyl) - phenothiazine, 27.2 g. of diethylamine and 125 cc. of benzene is kept at a bath temperature of 70° whilst stirring for 4 hours. After cooling, dilution is effected with 150 cc. of benzene and extraction is effected with 200 cc. of a 15% aqueous tartaric acid solution. The tartaric acid extract is washed out with 75 cc. of concentrated sodium alkaline with approximately 50 cc. of concentrated sodium hydroxide and the precipitated oily base is taken up in 250 cc. of benzene. After washing out the benzene layer with 75 cc. of water, it is concentrated. The resulting compound indicated in the heading is used further without purification.

Fumarate.—The fumarate is produced by dissolving at the boil in 150 cc. of acetone 18.5 g. of the evaporation residue and 6.05 g. of fumaric acid, filtering the resulting solution and then cooled same, whereby a precipitate results. After crystallization from 2000 cc. of ethyl acetate, the pure 3 - methylmercapto - 10 - (3 -diethylamino - propionyl)-phenothiazine fumarate, having a melting point of 117–119°, is obtained.

Nadisylate.—The nadisylate is produced by dissolving at the boil in 150 cc. of absolute ethanol 35.6 g. of the evaporation residue obtained above and 34.9 g. of naphthalene-1,5-disluphonic acid and subsequently cooling the resulting solution, whereby a precipitate results. After crystallization from 3000 cc. of 90% ethanol, the pure 3 - methylmercapto - 10 - (3 - diethylamino - propionyl) - phenothiazine nadisylate, having a melting point of 224–226°, is obtained.

Example 2.—3-ethylmercapto-10-(3-diethylamino-propionyl)-phenothiazine (a) 3-ethylmercapto - 10 - (3-chloropropionyl)-phenothiazine.—53.9 g. of 3-chloro-propionic acid chloride are added dropwise at a bath temperature of 150° whilst stirring for half an hour to a boiling solution of 100 g. of 3-ethylmercapto-phenothiazine in 400 cc. of toluene; boiling is then effected for a further 4 hours. The reaction mixture is concentrated by evaporating in a water jet vacuum at a bath temperature of 80°. The crude 3 - ethylmercapto - 10 - (3 - chloropropionyl) - phenothiazine obtained as evaporation residue is worked up further as such.

(b) 3 - ethylmercapto - 10 - (3 - diethylaminopropionyl)-phenothiazine.—The reaction and working up are effected in a manner analogous to that descirbed in Example 1(b), using the following amounts: 35.0 g. of 3 - ethylmercapto - 10 - (3 - chloropropionyl) - phenothiazine, 29.3 g. of diethylamine and 150 cc. of benzene. The resulting compound indicated in the heading in the heading is worked up without purification.

Fumarate.—The fumarate is produced by dissolving at the boil in 100 cc. of acetone 21.95 g. of the evaporation residue obtained above and 6.93 g. of fumaric acid and cooling the resulting solution, whereby a precipitate results. After crystallization from 130 cc. of acetone, the pure 3 - ethylmercapto - 10 - (3 - diethylamino - propionyl)-phenothiazine fumarate, having a melting point of 107–109°, is obtained.

Nadisylate.—The nadisylate is produced by dissolving at the boil in 250 cc. of ethanol 36.3 g. of the evaporation residue obtained above and 34.3 g. of naphthalene-1,5-disulphonic acid and then cooling the resulting solution, whereby a precipate results. After crystallization from 2200 cc. of ethanol, the pure 3-ethyl-mercapto-10-(3-diethylamino-propionyl)-phenothiazine nadisylate, having a melting point of 186–188°, is obtained.

Example 3.—3-methylmercapto-10-(3-dimethyl-aminopropionyl)-phenothiazine 40.0 g. of 3-methylmercapto-10-(3-chloropropionyl)-phenothiazine, 32.2 g. of dimethylamine and 200 cc. of benzene are heated in an autoclave at a bath temperature of 120° for 6 hours. After cooling, 150 cc. of benzene are added to the reaction mixture; washing out is effected twice, each time with 75 cc. of water and extraction is then effected with 230 cc. of a 15% aqueous tartaric acid solution. The tartaric acid extract is washed out with 75 cc. of benzene, is made alkaline with approximately 60 cc. of concentrated sodium hydroxide and the precipitated base is taken up in 300 cc. of benzene. After washing out the benzene layer with 100 cc. of water, it is concentrated. Purification is effected by crystallizing the evaporation residue twice from a 4-fold quantity of absolute ethanol. The resulting pure 3-methylmercapto-10 - (3 - dimethylamino-propionyl) - phenothiazine has a melting point of 97–99°.

Example 4.—3-methylmercapto-10-(3-methyl-amino-propionyl)phenothiazine 60.0 g. of 3-methylmercapto-10-(3-chloropropionyl)-phenothiazine and 33.3 g. of methylamine are reacted in 200 cc. of benzene in a manner analogous to that described in Example 1(b), and the reaction mixture is worked up as indicated in said Example. 33 g. of the resulting benzene evaporation residue are dissolved in 60 cc. of benzene containing 5% of methanol and adsorbed on 800 g. of silica gel. The first 9 litres of benzene+5% of methanol eluate are discarded, and the following 2.5 litres of eluate are concentrated by evaporation. The resulting compound indicated in the title is used further without purification.

Tartrate.—The tartrate is produced by dissolving 11.0 g. of the evaporation residue obtained above in 110 cc. of ethyl acetate and adding same in the cold to a cold solution of 5 g. of tartaric acid in 950 cc. of ethyl acetate. The resulting precipitate is filtered off and subsequently washed out and dried. The resulting pure 3-methylmercapto - 10 - (3 - methylamino-propionyl)-phenothiazine tartrate hydrate has a melting point of 75°–80°, sintering at 50°.

Nadisylate.—The nadisylate is produced in that 7.55 g. of the base and 8.34 g. of 83% naphthalene-1,5-disulphonic acid are dissolved at the boil in 40 cc. of absolute ethanol and the solution is allowed to crystallize. After crystallization from 60% ethanol, the pure nadisylate of 3 - methylmercapto - 10 - (3 - methylamino-propionyl)-phenothiazine, having a melting point of 244–246°, is obtained.

Example 5.—3-methylmercapto-10-(3-ethyl-amino-propionyl)-phenothiazine 40.0 g. of 3-methylmercapto-10-(3-chloropropionyl)-phenothiazine and 32.2 g. of ethylamine are reacted in 200 cc. of benzene in a manner analogous to that described in Example 1(b) and the reaction mixture is worked up as indicated in said example. The compound indicated in the heading, obtained as residue after evaporating the benzene solution, is worked up further without purification.

Hydrochloride.—The hydrochloride is produced by dissolving the benzene evaporation residue obtained above in 120 cc. of absolute ethanol and a solution of hydrogen chloride in ethanol is added until an acid reaction to Congo red is obtained. The resulting salt is crystallized from 750 cc. of 97% ethanol, whereby the pure 3-methylmercapto - 10 - (3 - ethylamino-propionyl)-phenothiazine hydrochloride, having a decomposition point of 203°–205°, is obtained.

Example 6.—3-methylmercapto-10-(3-amino-propionyl)-phenothiazine

A mixture of 40.0 g. of 3-methylmercapto-10-(3-chloropropionyl)-phenothiazine, 68.8 g. of an 18% solution of ammonia in ethanol and 200 cc. of benzene is heated in an autoclave at a bath temperature of 120° for 6 hours. After cooling, the reaction mixture is diluted with 300 cc. of benzene and extracted with 200 cc. of a 2.5% aqueous tartaric acid solution. The tartaric acid extract is washed out with 50 cc. of benzene, is made alkaline with 10 cc. of concentrated sodium hydroxide solution and the precipitated oily base is taken up in 100 cc. of benzene. The benzene solution is washed out with 25 cc. of water and then concentrated. The resulting compound indicated in the heading is worked up further without purification.

Hydrochloride.—The hydrochloride is produced by dissolving in 50 cc. of absolute ethanol 12.2 g. of the evaporation residue obtained above and adding thereto a solution of hydrogen chloride in ethanol until an acid reaction to Congo red is obtained. The resulting prepicitate is crystallized from 250 cc. of 90% ethanol, whereby the pure 3 - methylmercapto - 10 - (3 - aminopropionyl)-phenothiazine hydrochloride, having a decomposition point of 222°–224°, is obtained.

Example 7.—Description of a tablet composition

|   | Grams |
|---|---|
| 3 - methylmercapto - 10 - (3 - diethylamino propionyl)-phenothiazine | 55 |
| Tragacanth | 2 |
| Lactose | 34.5 |
| Maize starch | 5 |
| Talcum | 3 |
| Magnesium stearate | 0.5 |
| Alcohol SD–30 [1] |   |
| Distilled water [1] |   |

[1] The necessary amounts.

The weight of the tablets produced depends on the dose of active compound to be administered.

What is claimed is:

1. A compound selected from the group consisting of a compound of formula:

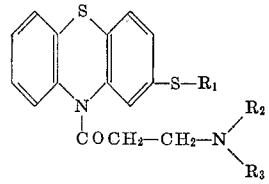

in which $R_1$ is alkyl of 1 to 4 carbon atoms, and each of $R_2$ and $R_3$ is hydrogen or alkyl of 1 to 4 carbon atoms, and a pharmaceutically acceptable acid addition salt thereof.

2. The compound according to claim 1 which is 3-methylmercapto - 10 - (3 - diethylamino-propionyl)-phenothiazine.

3. The compound according to claim 1 which is 3-ethylmercapto - 10 - (3 - diethylamino-propionyl)-phenothiazine.

4. The compound according to claim 1 which is 3 - methylmercapto - 10 - (3 - dimethylamino-propionyl)-phenothiazine.

5. The compound according to claim 1 which is 3 - methylmercapto - 10 - (3 - methylamino-propionyl)-phenothiazine.

6. The compound according to claim 1 which is 3 - methylmercapto - 10 - (3 - ethylamino-propionyl)-phenothiazine.

7. The compound according to claim 1 which is 3 - methylmercapto - 10 - (3 - aminopropionyl)-phenothiazine.

8. A compound of the formula:

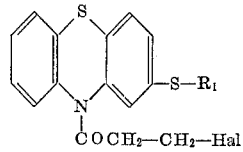

in which $R_1$ is alkyl of 1 to 4 carbon atoms, and Hal is chlorine or bromine.

References Cited

UNITED STATES PATENTS 2,928,767   5/1960   Gulesich et al. _____ 260—243

FOREIGN PATENTS 1,060,715   4/1954   France.

HENRY R. JILES, *Primary Examiner.*

H. I. MOATZ, *Assistant Examiner.*